Patented Jan. 16, 1923.

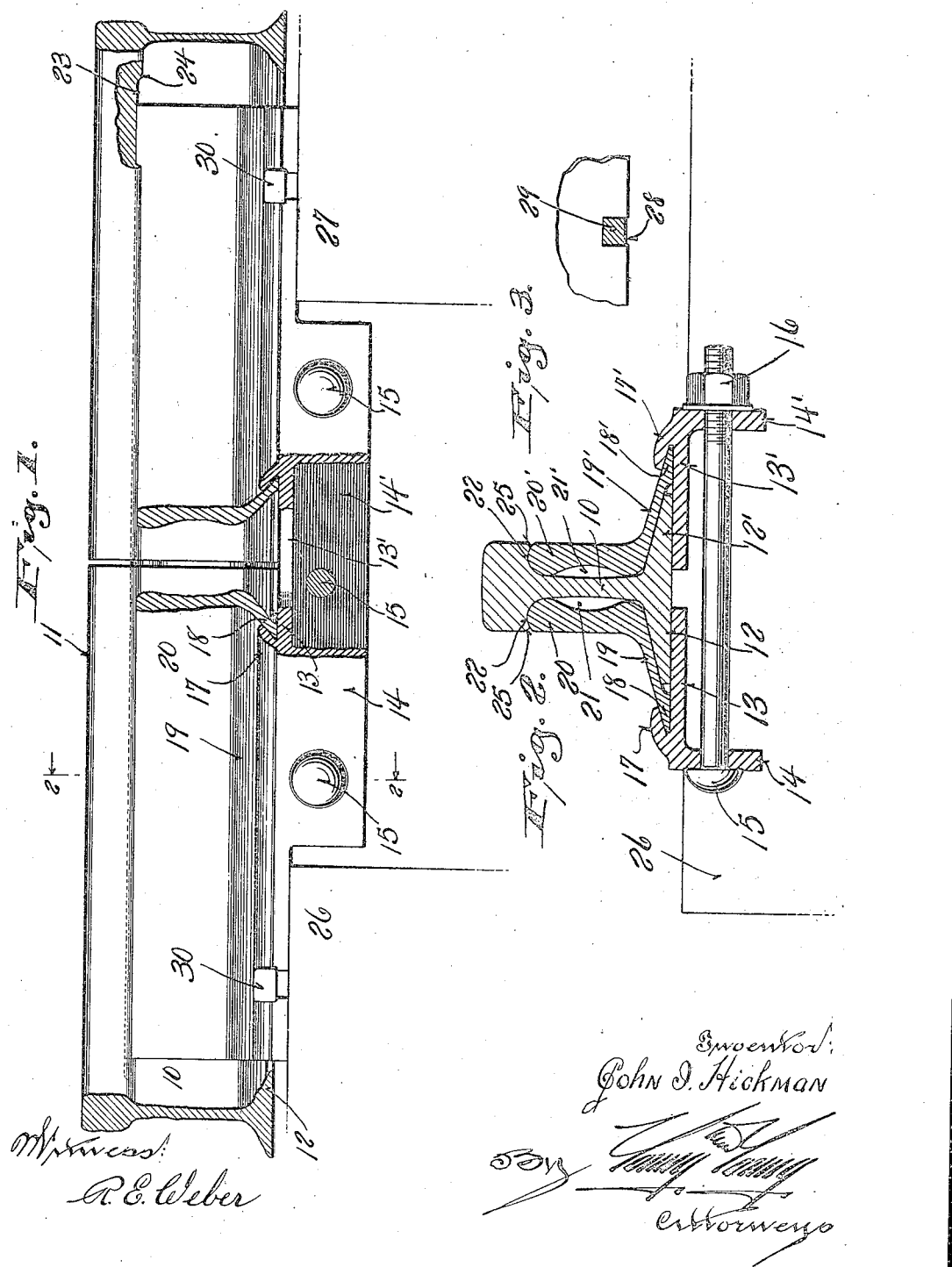

1,442,472

UNITED STATES PATENT OFFICE.

JOHN I. HICKMAN, OF MILWAUKEE, WISCONSIN.

RAIL SPLICE.

Application filed March 21, 1922. Serial No. 545,434.

*To all whom it may concern:*

Be it known that I, JOHN I. HICKMAN, a citizen of the United States, and resident of Milwaukee, in the county of Milwaukee and State of Wisconsin, have invented certain new and useful Improvements in Rail Splices; and I do hereby declare that the following is a full, clear, and exact description thereof.

Hitherto difficulty has been experienced with rail joints, because of the limited expansion and contraction permitted to the rails on account of the action of bolts, and because of cut bolts, loose nuts, and broken splice bars. Each of these defects creates grave dangers and often times results in the derailing of a train. Again, it occasions considerable expense because of the need of renewing the parts.

A primary object of the invention is the provision of parts operative to permit a free and unlimited expansion and contraction. The splice bars are not bolted directly to the rails, nor are the bottom plates, but the rails are free to slide longitudinally on the bottom plates so that even though a rail should expand very considerably, it would not reach a limit of expansion, but would travel freely in a longitudinal line over the bottom plates. This feature of expansibility and contractibility is highly important. Where a rail is limited in its expansion, a deformation thereof may occur which might result in the wrecking of a train. This form of danger is of the greatest importance.

Another object of the invention is the elimination of defects of devices of the prior art, due to the nature of the bolts which are directed through fish plates and a rail. Hitherto the expansion of rails and the thumping of heavy cars have often times operated to cut, bend, or wear the bolts. This necessitates a frequent renewal of the parts, which is expensive from the standpoint of material and labor. The cutting of the bolts is, also, very dangerous as the rails are then readily removed from alined position and derailing often times occurs under such circumstances.

Hitherto, the thumping of wheels over rail joints producing vibration of fish plates, was operative to loosen the nuts on the bolts, thus rendering the bolts inoperative. These nuts must be tightened up from time to time and involve an element of danger. Applicant's bolts are so positioned that the vibration of the passing cars is not transmitted to them directly. They are so far removed from the point of jar that the motion transmitted to them has but negligible effect.

The splice bars of the prior art have been apertured for the reception of bolts and the provision of openings, resulting in a weakening of the splice bar structure so that on the exertion of considerable tension, they have weakened and become deformed or broken. Similarily, the rails have been provided with apertures and these, also, have tended to weaken them. Applicant's device obviates these defects entirely as there is a total absence of openings in the splice bars and rails and the surfaces of the elements are continuous and regular. The transverse strength of the splice bar is substantially constant at all points so that the rail and bar are operative to sustain very considerable weight without danger of collapsing.

With the above and other objects in view, which will appear as the description proceeds, my invention resides in the novel construction, combination and arrangement of parts, substantially as hereinafter described and more particularly defined by the appended claim, it being understood that such changes in the precise embodiment of the herein disclosed invention may be made as come within the scope of the claim.

In the accompanying drawing, I have illustrated one complete example of the physical embodiment of the present invention constructed according to the best mode I have so far devised for the practical application of the principles thereof, and in which:—

Figure 1 is a side elevation of the invention, parts broken away.

Figure 2 is a cross section on the line 2—2 of Figure 1, and

Figure 3 is a detail of a spike as associated with a bottom plate.

The rails are of conventional form having a web 10 terminating in a head 11 and in flanges 12, 12′ at the bottom of the rail. Contacting with the bottom are a pair of substantially similar base plates 13, 13′ having their inner edges spaced slightly apart. They are provided with downwardly directed flanges 14, 14′ apertured to receive bolts 15 threaded to receive nuts 16. The bolts are of ordinary construction and are applied in the common manner an elliptical at one end to be received in an elliptical opening in the flanges so that nut 16 may be tightened up. The bottom plates 13, 13' are provided with longitudinal jaws 17, 17' having angular recesses therein for the reception of wedges 18, 18' at the edges of brace portions 19, 19' of splice bars 20, 20'. The brace portions 19, 19' have flat surfaces and maintain a large circumferential contact with flanges 12, 12'. The splice bars 20, 20' have concave recesses 21, 21' on their inner sides and their upper edges are curved, as shown at 22, the rails having grooves 23 to receive the upper edges of splice bars 20, 20' and these grooves terminate at shoulders 24. This is a preferred construction. It is produced by merely milling out the heads 11 of the rails.

If desired, the grooves 23 may be extended the entire length of the rail in which case it is produced by milling, or the rail may be rolled into this form. Obviously, the head 11 on the rail is unable to move to either side because of the bracing action of splice bars 20, 20' nor can either of these splice bars be displaced from its position because the groove 23 terminates at, substantially, a longitudinal flange 25 tending to prevent lateral movement of the splice bar with respect to the rail. Jaws 17, 17', also cooperate with wedges 18, 18' to maintain splice bars 20, 20' in position. Splice bars 20, 20' are maintained tightly in place and there is no possibility of movement of flanges 12, 12' which are held securely between bottom plates 13, 13' and bracing portions 19, 19'.

The various elements may be readily placed in position between ties 26 and 27 from which flanges 14, 14' are slightly spaced. The bottom plates 13, 13' are provided with slots 28 for the reception of spikes 29, the heads 30 of which contact with jaws 17, 17' and maintain the plates immovable with respect to ties 26 and 27. Thus there is no tendency for the bottom plates to creep.

I claim:—

In a rail splice, the combination of a pair of substantially alined rails, said rails having recesses, splice bars having upper edges fitting in said recesses, bottom flanges on said rails, bracing portions integral with said splice bars, a pair of bottom plates, longitudinal jaws on said bottom plates receiving the edges of said bracing portions, flanges downwardly directed from said bottom plates, and bolts extending through said flanges.

In testimony that I claim the foregoing I have hereunto set my hand at Milwaukee, in the county of Milwaukee and State of Wisconsin.

JOHN I. HICKMAN.